(12) United States Patent
Hagedorn et al.

(10) Patent No.: US 11,659,842 B2
(45) Date of Patent: May 30, 2023

(54) PORTIONING DEVICE AND METHOD

(71) Applicant: VEMAG MASCHINENBAU GMBH, Verden (DE)

(72) Inventors: Jan-Nils Hagedorn, Verden (DE); Alexander Lewin, Verden (DE)

(73) Assignee: Vemag Maschinenbau GmbH, Verden (DE)

( * ) Notice: Subject to any disclaimer, the term of this patent is extended or adjusted under 35 U.S.C. 154(b) by 64 days.

(21) Appl. No.: 17/474,428

(22) Filed: Sep. 14, 2021

(65) Prior Publication Data
US 2022/0079174 A1  Mar. 17, 2022

(30) Foreign Application Priority Data
Sep. 15, 2020 (DE) .......................... 102020124001.5

(51) Int. Cl.
*A22C 11/00* (2006.01)
*B65G 47/28* (2006.01)

(52) U.S. Cl.
CPC ............ *A22C 11/008* (2013.01); *B65G 47/28* (2013.01); *B65G 2201/0202* (2013.01)

(58) Field of Classification Search
CPC combination set(s) only.
See application file for complete search history.

(56) References Cited

U.S. PATENT DOCUMENTS 4,129,923 A    12/1978  Hoegger
4,614,005 A *  9/1986  Townsend ............ A22C 11/107
                                                         198/805
4,905,349 A *  3/1990  Townsend ............ A22C 11/107
                                                          53/550

(Continued)

FOREIGN PATENT DOCUMENTS

DE        2745452 A1    6/1978
DE    102017120101 A1   2/2019

(Continued)

OTHER PUBLICATIONS

European Patent Office, Examination Report and Written Opinion issued in European patent application serial No. 21196398.8 dated Nov. 22, 2022, 10 pages.

(Continued)

*Primary Examiner* — Richard T Price, Jr.
(74) *Attorney, Agent, or Firm* — Thompson Hine LLP

(57) ABSTRACT

Portioning devices and methods for portioning and conveying elongate casings stuffed with a mass. Circulating conveyor belts are arranged adjacent to each other for conveying the stuffed casings. Each conveyor belt has a conveying area which in operation is moved in a conveying direction, and a return area, wherein the stuffed casing is introduced between the conveying areas of the two conveyor belts and can then be conveyed in the conveying direction. At least one divider is arranged on each conveyor belt and projects laterally from the conveyor belt. The dividers of the adjacent conveyor belts cooperate in the conveying areas in such a way that the stuffed casing is constricted. The divider has a constriction portion for engaging with the stuffed casing and which extends, in operation, substantially at a slant relative to a plane defined as perpendicular to the conveying direction.

18 Claims, 5 Drawing Sheets

(56) References Cited

U.S. PATENT DOCUMENTS

| | | | |
|---|---|---|---|
| 5,830,051 A * | 11/1998 | Kasai ................ | A22C 11/108 452/46 |
| 10,548,329 B2 | 2/2020 | Mach et al. | |
| 2008/0070489 A1 | 3/2008 | Bachtle | |
| 2022/0079174 A1* | 3/2022 | Hagedorn ............ | A22C 11/008 |

FOREIGN PATENT DOCUMENTS

| | | |
|---|---|---|
| EP | 1112691 A1 | 7/2001 |
| EP | 1902622 A1 | 3/2008 |

OTHER PUBLICATIONS

European Patent Office, Third Party Observations issued in European patent application serial No. 21196398.8 dated Nov. 18, 2022, 16 pages.

The German Patent and Trade Mark Office, Examination Report issued in Application No. 10 2020 124 001.5 dated Mar. 9, 2021.

\* cited by examiner

Fig. 1
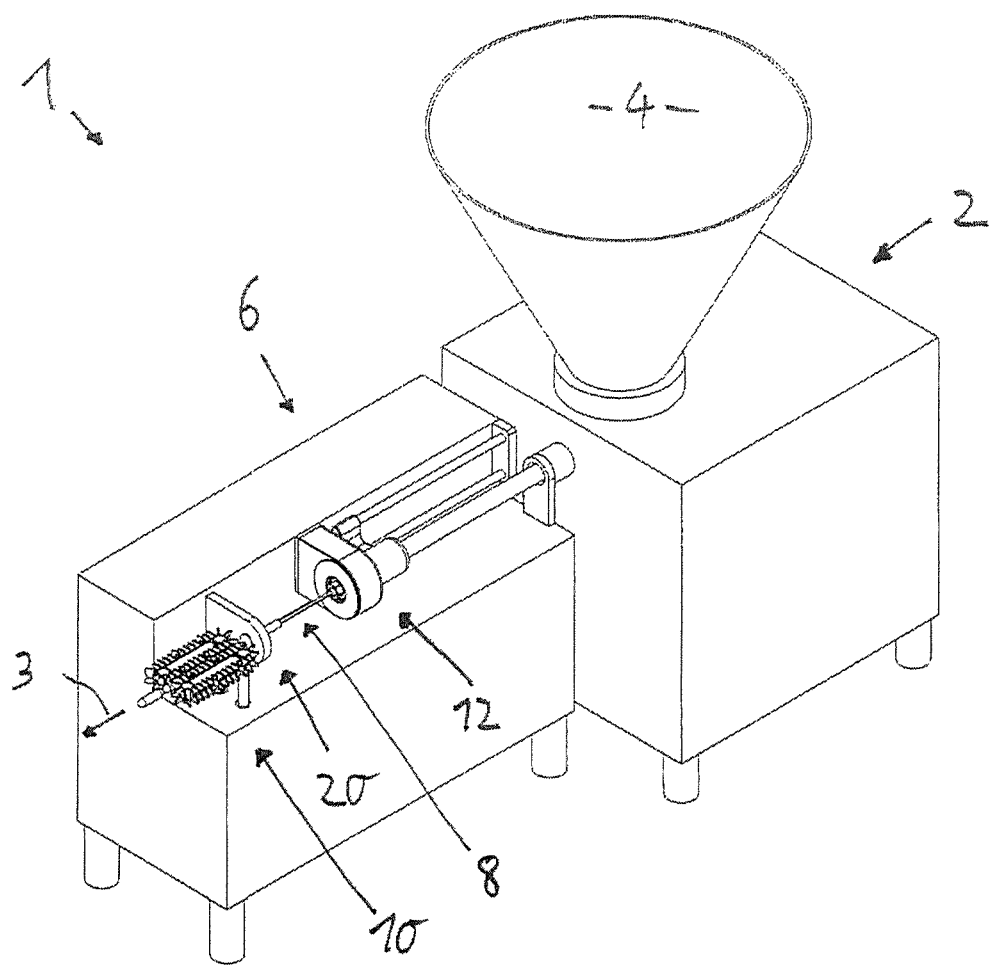
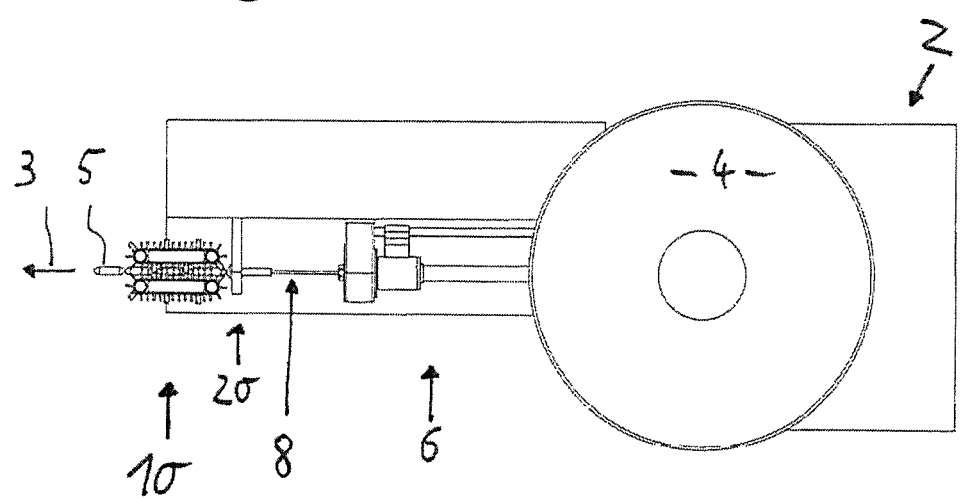
Fig. 2

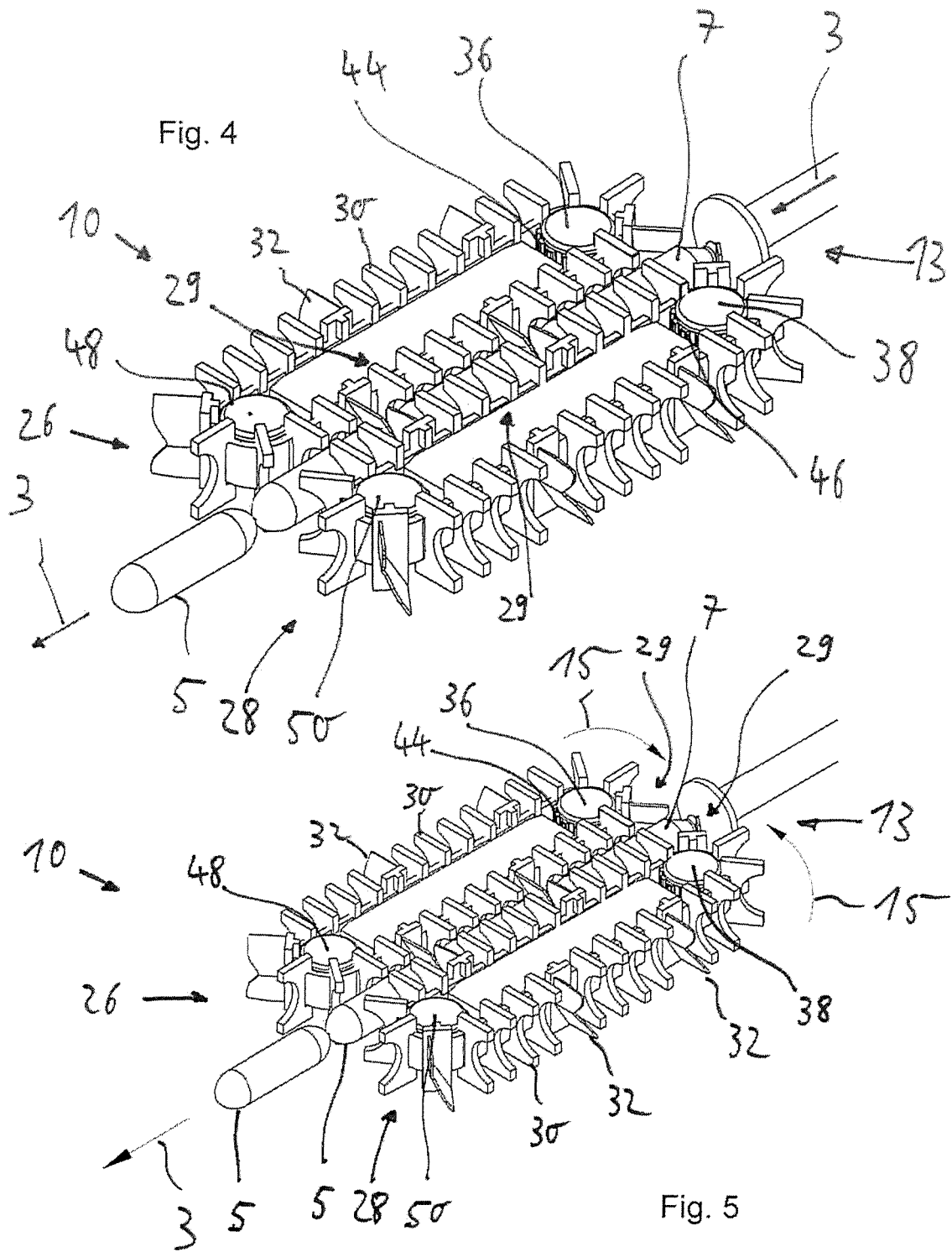

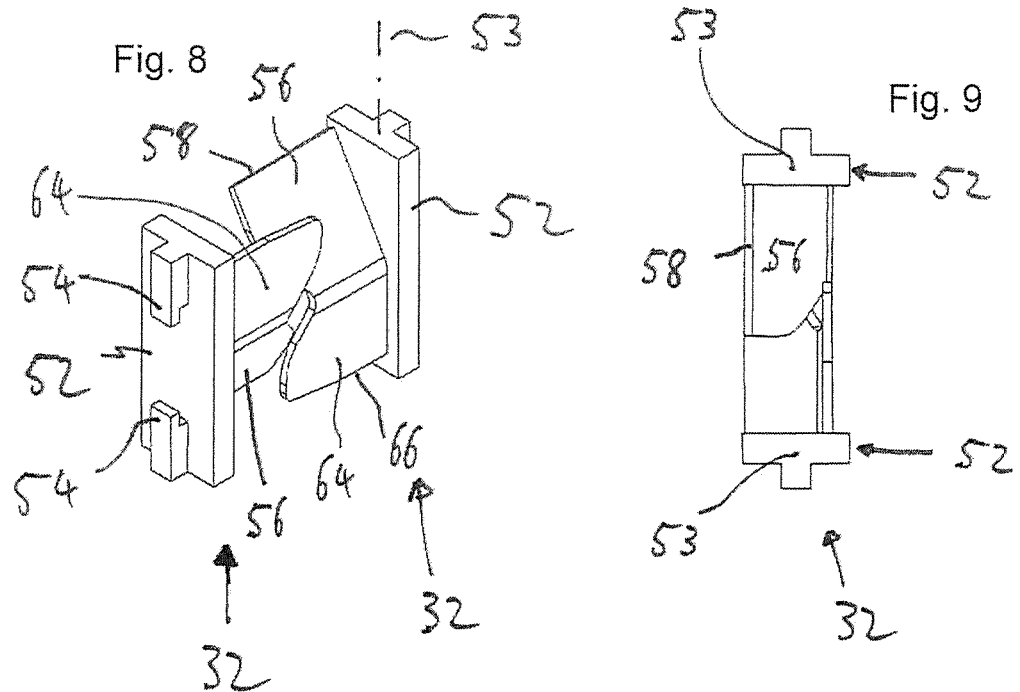
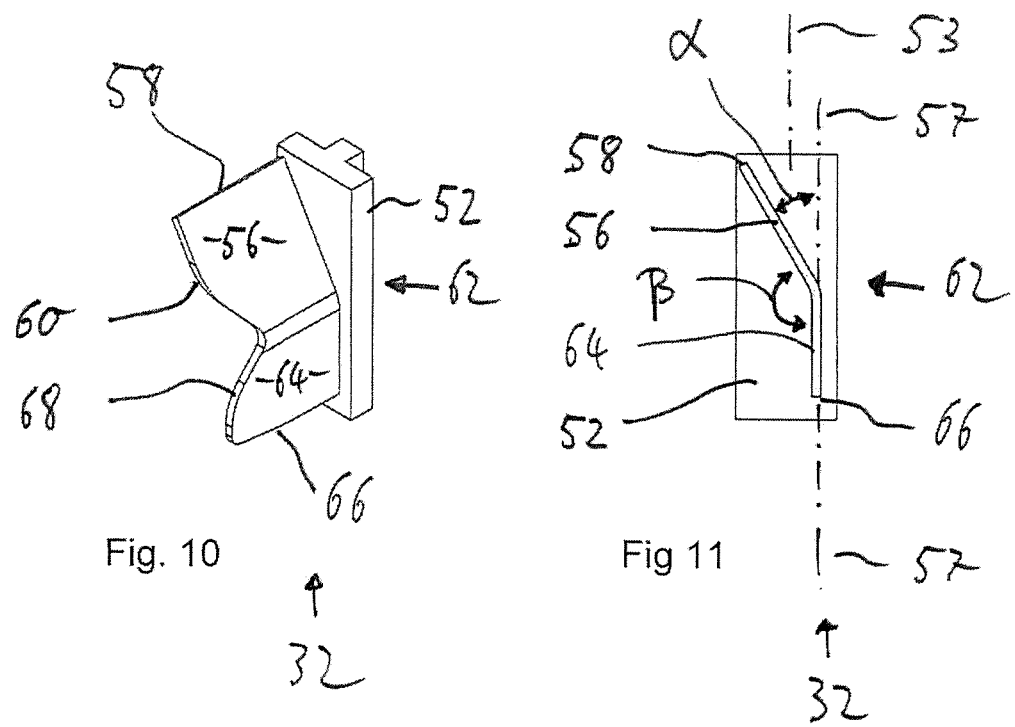

PORTIONING DEVICE AND METHOD

FIELD OF THE INVENTION

The invention relates to a portioning device for portioning and conveying elongate casings stuffed with a mass, in particular synthetic or natural gut casings stuffed with sausage meat, comprising two circulating conveyor belts arranged adjacently to each other for conveying the stuffed casing and which are drivable by at least one drive means, wherein each conveyor belt has a conveying area which in operation is moved in a conveying direction, and a return area, wherein the stuffed casing is introduced between the conveying areas of the two conveyor belts and can then be conveyed in the conveying direction, at least one divider arranged on each conveyor belt and projecting laterally from the conveyor belt, wherein two dividers of the adjacent conveyor belts cooperate in the conveying area in such a way that the stuffed casing is constricted.

The invention also relates to a divider for a portioning device and to a method for portioning.

BACKGROUND

In prior art methods and devices for producing sausages, synthetic or natural gut casings are stuffed with a pasty mass such as meat emulsion with the help of a pump or a stuffing machine and portioned with the help of a portioning device; other types of mass are also stuffed into a casing in the same manner. The mass is often provided by a stuffing machine that has a feeding hopper and a feed pump. In prior art methods, a twist point separating the individual sausage portions from one another is produced in the gut casing by means of a twist linking unit and a portioning device.

Such portioning devices are often referred to as length portioning equipment, in which portions or sausages having the same volume or the same length are produced. An example of such length portioning equipment consists substantially of two parallel circulating chains or belts that run parallel to each other at the same speed in a conveying direction in sections in a conveying area, and that guide the stuffed gut casing in an intermediate space formed between the two chains or belts.

At intervals approximately equal to the length of a sausage, the chains or belts have laterally projecting dividers which converge in pairs, during operation, with an oppositely located divider of the adjacent chain or conveyor belt, thereby jointly constricting the stuffed gut casing at an engagement point or constriction point. Due to rotational movement of the stuffed casing about the longitudinal axis and the engagement of the dividers at the engagement point, the rotation is reduced in the region of the engagement point, and a twist point starts to form. Guide members that support or guide the stuffed gut casing—and which protrude less far in comparison with the dividers—are located between the dividers on the chains or belts. In prior art length portioning equipment, the dividers and the guide members are normally glued, riveted, fastened or form-fittingly attached to the chain or belt, for example by means of a detent connection. These systems are also called divider chains or divider belts.

Devices are also known in which the dividers are fixed to rotating shafts instead of to chains or belts, wherein two shafts are arranged substantially parallel to each other, and the dividers of adjacent shafts rotate synchronously and form an engagement point when a string of sausages or a casing stuffed with some other food mass is conveyed through the device.

The dividers are particularly important with regard to the reliability and efficiency of formation during production. Problems encountered in the production of sausages in prior art portioning devices or systems having dividing belts or dividing chains or displacers concern the limited amount of time available for the dividers to penetrate the area of the engagement point, for accurate placement of the twist point, which is important for achieving the aim of equal sausage lengths, and the load applied to the sausage casing. As the speed of the process, the output speed, increases, formation of the twist point imposes an increasing amount of stress and strain on the gut casing. The time available to form the twist point is shortened. Inadvertent twists can occur in between. Attempts are made to compensate for these by increasing the brake tension. However, this increased brake tension also leads to greater stress on the casing and to burst casings.

SUMMARY

The object of the invention is therefore to provide a portioning device and a divider and a portioning method that counteract the aforementioned and other problems and in particular which allow reliable formation of twist points in a way that is gentle on the casing.

According to the invention, it is proposed for a portioning device of the kind initially specified that the divider has a (first) constriction portion which extends in operation substantially at a slant relative to a plane defined as perpendicular to the conveying direction. (Claim 1)

By means of a divider according to the invention that, in operation, has a substantially slantingly extending—first—constriction portion, the engagement between the constriction portion and the stuffed casing, i.e., in particular a string of sausages formed by a synthetic or natural gut casing and sausage meat, is improved. The constriction portion runs at a slant relative to a theoretical plane defined as perpendicular to the conveying direction. In the following, the expression "string of sausages" is used synonymously for an elongate casing which is stuffed with a preferably pasty mass, such as sausage meat or other foods. In a portioning device according to the invention, two synchronously moved dividers generally cooperate that are each arranged on one of the spaced-apart conveyor belts. Two cooperating dividers are fixed to the conveyor belt in such a way that they are moved towards each other in the conveying area between the two conveyor belts and are then moved further into the conveying area in the conveying direction. Due to the two dividers being moved towards each other and generally engaging with each other, the dividers engage each other at an engagement point, constrict the string of sausages and generate a kind of separation of portions in the string of sausages. Due to the fact that the string of sausages generally also rotates about its longitudinal axis, a twist point is formed as a result. The successive application of a plurality of such twist points results in substantially portioned, approximately equally long portions. In operation, it is preferable that the conveyor belts are arranged substantially in a common plane, preferably in a horizontal plane or in a plane that is slightly inclined relative to a horizontal plane. In operation, the constriction portions of the dividers run at a slant relative to the plane defined as perpendicular to the conveying direction, which may be substantially vertical, for example. The end of the sausage and the start of the new sausage are predetermined when the divider elements immerge into the string of sausages. This is the start of a (further) twist point being produced. This engagement of the slanted constriction portions preferably occurs in a deflection region for the circulating belt, which is formed by a bearing and a guide wheel. This part of the conveying area, also called the infeed area, is what sets the twist point, therefore. According to the invention, the cooperating dividers each have such a slanting constriction area, with the result that the trailing end of the sausage portion is subsequently in contact on the straight conveying area with the two slanting constriction areas of the cooperating dividers opposite each other. According to the invention, a conveyor belt is understood to be a endless belt made of plastic, metal or a fabric, or a chain, a toothed belt or some other component having the same effect.

According to the invention, the divider is shaped in such a way that the end of one sausage, i.e., a portion of the stuffed casing, abuts a slanted area, while the sausage starting side of an adjacent portion faces a straight, substantially flat area (almost perpendicular to the belt body) and can abut the latter. Due to the substantially flat surface of the divider at the start of the sausage, the radial immergence of the divider into the sausage casing (via the deflection roller), and a concomitant "shovel effect", preferably followed by a straight, linear movement of the divider, preferably along a path of at least 20 mm in the conveying direction, the rotational friction of the sausage casing against the dividers is greatly reduced. The twist point forms much earlier, faster and more gently as a result, and a lower torque is necessary. Due to the dividers projecting radially from the conveyor belt, the outer regions in the deflection region are accelerated relative to the linear path of movement in the conveying area, because the dividers are moved on a circular path. This results in the advantageous "shovel effect" mentioned above.

Due to the geometry according to the invention, and the change in contour compared to prior art dividers, in conjunction with the conditions according to the invention as described above, the twist point can be formed in a shorter time and with less stress imposed on the gut casing in comparison with conventional apparatuses and methods. The brake tension can be reduced and the output of portioned products can be greatly increased. Intermediate twists and burst casings are greatly reduced as a result.

According to a preferred embodiment, the first constriction portion 56 is substantially slanted in operation at an angle of about 30°+/−15° relative to a vertical plane. Due to the slanting constriction portions of two cooperating dividers, constriction portions arranged with corresponding surfaces at an angle to each other are formed as a result, which come into contact with the end of the sausage portions previously conveyed in the conveying direction. The two constriction portions are in contact with the end of the sausage and prevent it from rotating, and they delay the rotational movement of the strings of sausages and support the formation of the twist point.

In a preferred embodiment, the divider has a second constriction portion that extends in operation substantially along a preferably vertical plane. The second constriction portions having vertically arranged surfaces result in a substantially straight surface or boundary on the trailing side of the two partly intermeshing dividers moved in the conveying direction, a kind of flat wall or stop for the start of the sausage, where a twist point is created. On this side of the substantially flat surface of the two cooperating constriction portions, there is relatively little friction or mechanical interaction with the sausage casing and with the start of the following sausage portion. This positively favors the formation of the twist point in a gentle manner. The load on the gut casing is reduced. The brake tension is reduced. Intermediate twists and burst casings occur more rarely, according to the invention.

It is preferable that the first plate-shaped constriction portion and the second plate-shaped constriction portion substantially enclose an angle of 150°±15°. In this way, an interaction that brakes the rotational movement of the string of sausages is supported in a gentle manner.

According to another preferred embodiment of the invention, the first and second constriction portion taper from a lower or upper edge portion towards a region connecting the constriction portions. Due to the tapering, the cooperating dividers can intermesh and thus constrict the stuffed casing.

It is expedient if the first constriction portion has a larger surface relative to the second constriction portion. This results in an advantageous asymmetry of the divider, and the two dividers of the one and the other conveyor belt can intermesh in an advantageous manner.

According to another preferred embodiment of the invention, the dividers arranged on the conveyor belt can each be moved substantially on a circular path towards each other by a deflection region of the conveyor belts and form a twist point by engaging with the stuffed casing that rotates at least partially about its longitudinal axis, wherein a substantially straight section of the conveying area adjoins the deflection region. Due to the radius of the deflection region, the radially outer parts of the constriction portion have a higher peripheral speed, with the result that a kind of shovel effect ensues, i.e., a stronger immergence of the dividers into the stuffed sausage casing. On the linear path of movement in the conveying direction, the dividers then run again with a slightly reduced speed and then enter another deflection region in which the dividers are moved back into the return area.

According to an alternative embodiment of the invention, the two cooperating dividers of the adjacent conveyor belts are so designed that the first slanting constriction portions of the dividers each run ahead and the second constriction portions each run behind when viewed in the conveying direction.

According to another alternative preferred embodiment of the invention, the two first constriction portions of the cooperating dividers are arranged in the conveying area substantially at an acute angle to each other, said angle preferably being 120°±30°. This allows the interaction with the end of the sausage to be optimized.

In a preferred embodiment of the invention, the second constriction portions of the cooperating dividers are arranged in the conveying area at least partly substantially within a substantially perpendicular plane, or in parallel substantially perpendicular planes. A kind of abutment surface for the front end of a next portion is thus formed, without causing greater friction between the rotating stuffed casing and the surfaces of the wall.

The first and second constriction portion and the fixing portion are preferably substantially plate-shaped, and the plate-shaped fixing portion is substantially rectangular in shape and extends substantially parallel to the adjacent conveyor belt, with the overall result that a mechanically favorable and simply manufactured construction of the dividers is realized.

According to another preferred embodiment of the invention, the divider is designed as a substantially integral component preferably made of a metal or plastic, wherein the divider preferably has a fixing portion for fixing to a conveyor belt. Other advantageous geometrical designs are the following:

It is expedient if the dividers are so designed that, in operation, two mutually cooperating dividers of the respective conveyor belts initially engage the stuffed casing in the infeed area by means of their respective slanting first plate-shaped constriction portions and form the twist point upon further reduction of the spacing between the cooperating dividers relative to each other.

According to another preferred embodiment of the invention, the first and second constriction portion of the two cooperating dividers are so designed and dimensioned that, in the conveying area during operation, they have a small spacing between each other in a central indentation region so as to form a cavity between the dividers.

According to an alternative embodiment, the two cooperating dividers are substantially identical in design, but are inversely positioned on the conveyor belts with a 180° offset from each other. In this way, the dividers can be arranged on the two conveyor belts so that they are rotated by 180 degrees and can thus engage each other well.

According to another preferred embodiment of the invention, a plurality of guide members that support the stuffed casing during operation are preferably arranged at each conveyor belt between adjacent dividers spaced apart by the length of a sausage portion to be produced.

According to the invention, the object is also achieved by a divider for a portioning device (claim 17), and by an assembly for producing portions from a casing to be stuffed with a food mass, comprising a stuffing machine which has a feeding hopper, for receiving the food mass, and a feed pump, a twist linking unit having a stuffing tube for stuffing the food mass by means of the stuffing machine into the casing to be stuffed and a portioning device according to at least one of the preceding claims, and reference is made to the described advantages of the portioning device (claim 19).

According to another aspect of the invention, the problem is solved with a method for producing portions in a casing stuffed with a food mass, in particular in synthetic or natural gut casings stuffed with sausage meat, in which method food mass is stuffed by means of a stuffing machine and a twist linking unit into the casing to be stuffed, and the stuffed casing rotating about its longitudinal axis is conveyed into the infeed and conveying area of a portioning device, preferably according to any one of the preceding claims, wherein the portioning device has two spaced-apart conveyor belts each having at least one divider fixed thereto, and wherein each divider has a (first) constriction portion which in operation extends substantially at a slant relative to a vertical plane, and the stuffed casing is gripped in an infeed area by cooperating dividers of each of the conveyor belts, which are moved towards one another, in order to form a twist point (claim 20).

BRIEF DESCRIPTION OF THE DRAWINGS

The invention shall now be described in greater detail with reference to a preferred embodiment and to the Figures, in which FIG. 1 shows a perspective view of an assembly for producing portions from a casing stuffed with a food mass, comprising a stuffing machine, a twist linking unit and a portioning device, FIG. 2 shows a top view of the assembly in FIG. 1, FIG. 4 shows a perspective view of the portioning device with two spaced-apart conveyor belts, FIG. 5 shows a perspective view of the portioning device with two spaced-apart conveyor belts, FIG. 8 shows a perspective view of two cooperating dividers, FIG. 9 shows a top view of two dividers, FIG. 10 shows a perspective view of a divider according to the invention, FIG. 11 shows a side view of the divider in FIG. 10.

DETAILED DESCRIPTION

Figure 3:
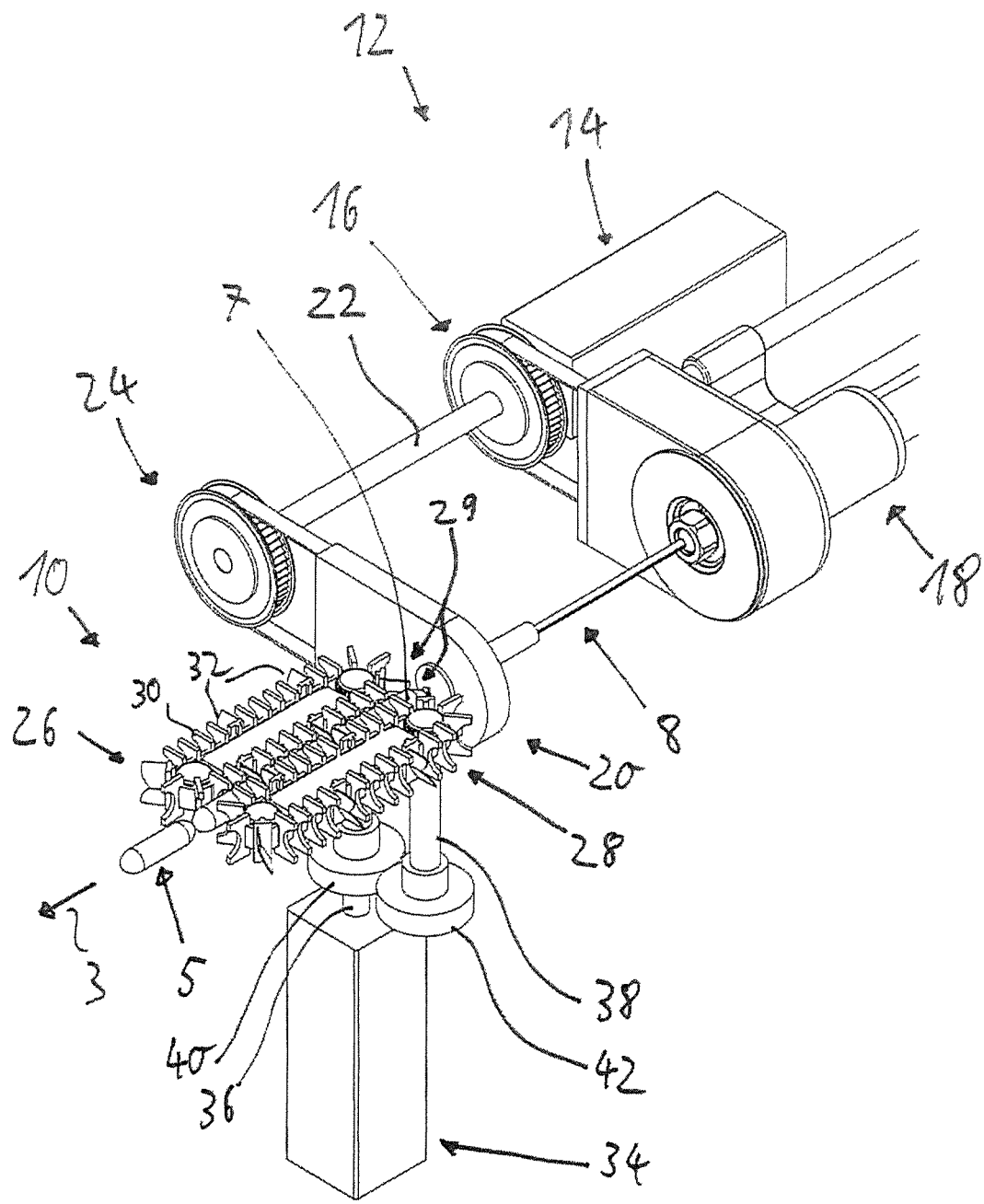
FIG. 3 shows a perspective view of a part of the twist linking unit and portioning device.
Figure 6:
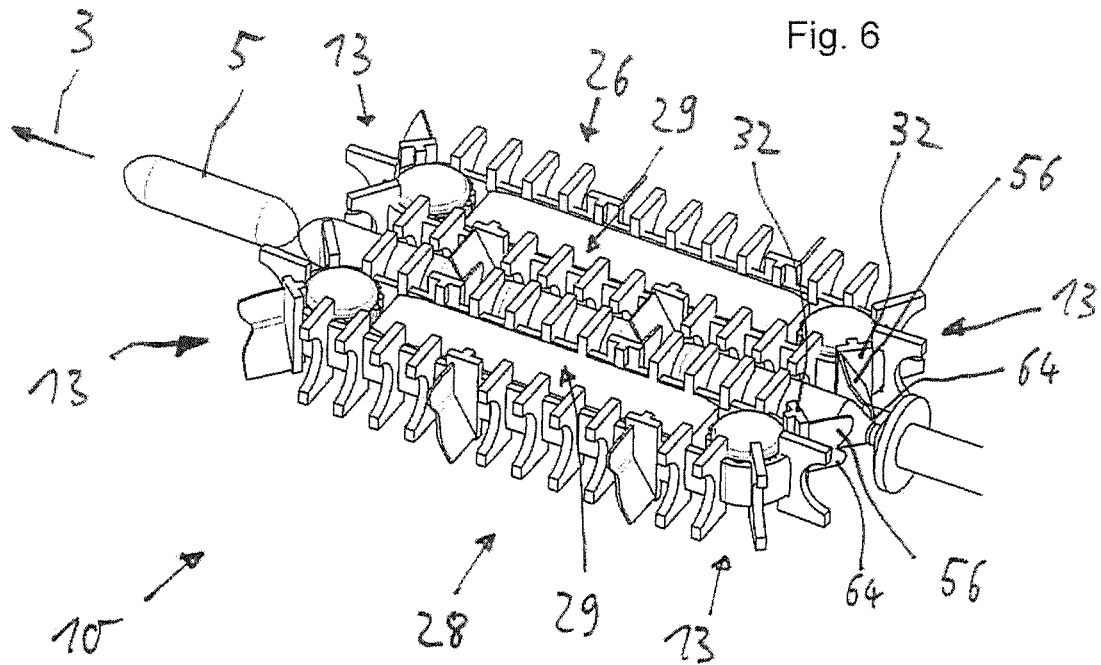
FIG. 6 shows another perspective view of the portioning device with two spaced-apart conveyor belts in an operating position.

FIG. 1 shows an assembly 1 for producing portions from a casing stuffed with a mass, in particular a pasty food mass, the assembly comprising a stuffing machine 2 having a feeding hopper 4 for receiving the food mass and having a feed pump, a twist linking unit 6 having a stuffing tube 8 for stuffing the food mass 2 into the casing to be stuffed, and a portioning device 10. Alternatively, in a manner not shown in the drawings, the stuffing machine and/or the twist linking unit and/or the portioning device may be designed in integrated form as a composite machine.

As FIGS. 1 to 3 show, the twist linking unit 6 has a drive unit 12 with a motor 14 and a toothed belt drive 16, so stuffing tube 8 can be driven rotatingly about its longitudinal axis. Stuffing tube 8 can also be moved axially by a traversing unit 18, to the right from the position shown in FIG. 3, in order to place gathered casings made of natural or synthetic gut onto stuffing tube 8, and then back into the operating position as shown. A casing brake 20 can be driven by means of motor 14, a drive shaft 22 and a further toothed belt drive 24 in such a way that a rotatable casing brake ring (not shown) can be rotated and driven synchronously with the stuffing tube 8. Stuffing tube 8 ends in the region of the of the casing brake ring.

In operation, a pasty mass such as sausage meat is dispensed into the casing to be stuffed, and a string of sausages 7 made of casing and sausage meat is conveyed in conveying direction 3 and further processed by portioning device 10. By means of twist linking unit 6 and portioning device 10, single portions are produced, in particular single sausage portions 5 or similar food products of equal length.

The portioning device 10 according to the invention shown in FIGS. 1 to 8 includes two conveyor belts 26, 28 having a plurality of guide members 30 mounted thereon and some dividers 32 mounted on conveyor belt 26, 28. Conveyor belts 26, 28 are made of a flexible material or are embodied alternatively as chains. Guide members 30 and dividers 32 are preferably coupled by means of a form-fitting snap connection or fastener connection or riveted connection to conveyor belts 26, 28. Guide members 30 project laterally from conveyor belt 26, 28 and preferably have a semi-circular recess that matches the substantially cylindrical contour of the string of sausages 7 and of sausage portions 5, such that the string of sausages 7 and the portions 5 formed are supported and guided, and due to the contact are also braked with regard to rotation of the string of sausages 7 during further conveying in conveying direction 3.

As FIG. 3 shows, portioning device 10 has a drive means 34, in particular in the form of an electric motor, a first drive shaft 36 and a second drive shaft 38, and gear wheels 40, 42 coupling the two drive shafts 36, 38 such that the two drive shafts 36, 38 are driven synchronously and in opposite directions by drive means 34. At their top end, drive shafts 36, 38 each have a gear wheel 44, 46 that drive conveyor belts 26, 28. By means of another two gear wheels 48, 50, conveyor belts 26, 28 are additionally supported and guided. In a manner known per se and not shown in detail, all the components of the portioning device are attached to a frame, which may have a plurality of sections such as mounting plates.

Each conveyor belt 26, 28 has a conveying area 29 in which, during operation, the components are moved along with the string of sausages 7 in substantially the conveying direction 3, a first deflection region 13 (FIGS. 6 and 7) in the area of the drive shafts 36, 38 and gear wheels 44, 46, and a second deflection region 13, spaced apart in conveying direction 3, in the area of gear wheels 48, 50. Each conveyor belt 26, 28 also has a return area in which the sections of conveyor belts 26, 28 are moved in the opposite direction to conveying direction 3. Conveyor belts 26, 28 are arranged spaced apart from each other in such a way that the stuffed casing or string of sausages 7 and the portions 5 being formed enter the space between conveyor belts 26, 28 and can be guided and conveyed in conveying direction 3.

As FIGS. 4 to 7 well illustrate, dividers 32 projecting laterally from conveyor belts 26, 28 are arranged in such a way, at specific distances from each other that correspond approximately to the length of a portion 5, that two synchronously driven dividers 32 that are substantially opposite one another in deflection region 13 and conveying area 29 can always cooperate in such a way that they move in deflection region 13 towards and come into contact with the string of sausages 7, and form or begin to form a constriction point and a twist point. The direction in which dividers 32 move in deflection region 13 is also illustrated by the arrows (FIG. 5).

As FIGS. 6 to 11 illustrate, each divider 32 preferably has a preferably substantially plate-shaped, cuboidal fixing portion 52, which is used to fix each divider 32 to conveyor belt 26, 28. For that purpose, fixing portion 52 has two protrusions 54 on its rear side (FIG. 8), which can cooperate with conveyor belt 26, 28, for example to form a kind of snap-fit connection. Other means of attachment, such as fasteners or rivets or adhesive may also be used. Each divider also has constriction projections or portions 56, 64, described in further detail below, which are used to come into contact with the string of sausages so as to form a constriction point and twist point.

In the Figures, conveyor belts 26, 28 are shown with dividers 32 in the normal operating position during operation. Conveyor belts 26, 28 lie substantially in a horizontal plane, or they can also be arranged alternatively at an incline thereto. The longitudinal axis 53 of fixing portion 52 is shown here in a substantially vertical arrangement during operation. As well illustrated in FIGS. 8 to 11, for example, divider 32 has a—first—preferably plate-shaped or lamellar constriction portion 56 that runs slantingly, i.e., which is at an incline relative to a preferably vertical plane 57 (FIG. 11) that in the normal operating state is arranged parallel to the vertically arranged longitudinal axis 53. The plane 57 is a theoretical, imaginary plane defined as perpendicular to conveying direction 3. In the embodiment shown, the angle of inclination a between constriction portion 56 and the preferably vertical plane 57 is about 30°, for example, but it may deviate from that figure, for example by ±15°. Constriction portion 56, in operation, has a substantially straight upper or lower edge 58 that extends substantially horizontally in operation, and a further, at least partly curved edge 60 extending partly with a curvature towards a middle region 62 of divider 32 and inwardly towards fixing portion 52. Constriction portion 56 thus tapers along edge 60 towards a middle region 62 of divider 32. The substantially plate-shaped constriction portion 56 extends substantially along a plane which is inclined relative to a vertical plane 57, but instead of lying in a plane, it could also have a different profile, a different contour or shape, including a curved shape, for example. Edges 58, 60 may also have curved shapes.

Another, second constriction portion 64 is preferably arranged likewise on each divider 32 and extends from fixing portion 52, projecting radially and laterally in operation. As shown by way of example, the second constriction portion 64 extends substantially vertically in normal operation and is thus arranged approximately in plane 57 or parallel to a preferably vertical plane 57. Alternatively, constriction portion 64 may also have more or less curved profiles, and nevertheless extend substantially vertically during operation.

The first constriction portion 56 and the second constriction portion 64 are preferably arranged at an angle to each other that differs from the 180° angle, and thus enclose an acute angle as illustrated by the angle β (FIG. 11). In the embodiment, angle β is approximately 120°, but it may deviate from that figure, for example by ±30°. Constriction portion 64 preferably has a straight edge 66, which during operation is an upper or lower edge depending on the arrangement of the divider, and which extends substantially linearly and parallel to the edge 58 of the first constriction portion 56, and has a second, at least partly curved edge 68 (FIG. 10) which tapers—radially—inwards from edge 66 towards a middle region 62 of divider 32. Edge 60 of the first constriction portion 56 and edge 68 of the second constriction portion 64 converge in a middle region 62. A kind of indentation is thus formed by the two constriction portions 56 and 64. Overall, the size or surface of the first constriction portion 56 is larger than the size or surface of the second constriction portion 64. Thus, divider 32 is preferably asymmetrical in shape.

As FIG. 8 well illustrates, the dividers 32 on conveyor belt 26 and the dividers 32 on conveyor belt 28 are arranged inversely with a 180° rotation relative to each other. This arrangement results in the opposite respective first constriction portions 56 leading in conveying direction 3 and enclosing an acute angle, for their part. A rear end of a portion 5 is thus enclosed in conveying area 29 by the substantially plate-shaped constriction portions 56 of the cooperating dividers 32, which are arranged at acute angles to each other. In operation, the first, leading constriction portions 56, are the first to come into contact in deflection region 13 with the string of sausages 7, in particular with their edges 58 and 60, and they start to form a constriction point and thus a twist point. The two other, second constriction portions 64 of the cooperating dividers 32 of the adjacent conveyor belts 26, 28 then lie, when they are moved in the straight section of the conveying area, substantially in a plane or in planes which are only a small distance apart, so that they form a kind of stop for a forward end or an end portion of the next portion 5, which is in the process of being formed, of the string of sausages 7. The two cooperating dividers 32 are partly intermeshed to that extent (FIG. 8, but also FIGS. 6 to 7), but they are preferably not in contact with each other and in the middle region 62 they form a small cavity or gap in the center between them.

Further features, and the operation of the portioning device 10 and the entire assembly 1 according to the invention, and also the method for producing portions, and other advantageous features, will become apparent from the following descriptions:

(Food) masses such as sausage meat is conveyed by means of the feed pump from feeding hopper 4 of stuffing machine 2 through stuffing tube 8 in conveying direction 3 and stuffed into the casing (gathered gut) previously placed onto stuffing tube 8 in the region of the casing brake 20 of twist linking unit 6. Conveying can be carried out continuously or discontinuously. A preferably rotating string of sausages 7 is formed (FIG. 4), which enters the portioning device 10 area in the conveying area of conveyor belts 26, 28.

Figure 7:
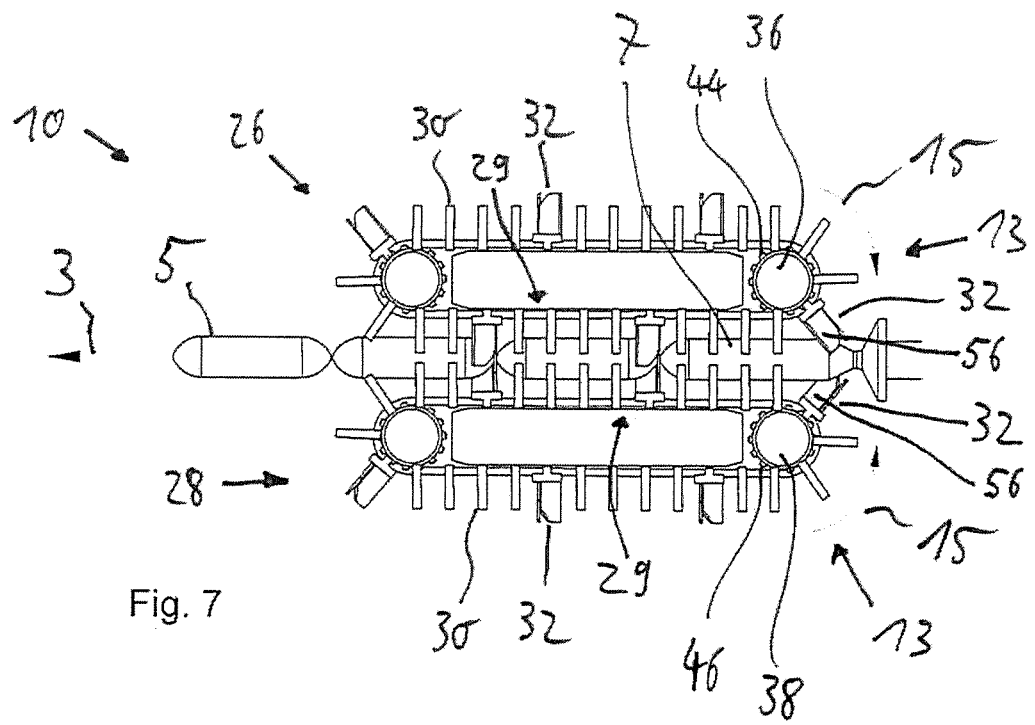
FIG. 7 shows a top view of the portioning device with two spaced-apart conveyor belts.

On their circular path in deflection region 13, two cooperating dividers 32 of opposite conveyor belts 26, 28 come into contact with portions of the respective first constriction portion 56, which is arranged substantially with a forward slant in the direction of movement and at an inclination relative to a vertical plane, also and in particular with parts of edges 58, 60 and with the front surface in the conveying direction, and engage the string of sausages 7. Due to the radial distance from the rotational axis of drive shafts 36, 38, the portions which come into contact have a higher peripheral speed in compared to the speed of dividers 32 and conveyor belts 26, 28 in the linear section of conveying area 29. This results in a "shovel effect" of the kind initially described. As FIG. 7 illustrates, the two constriction portions 56 of cooperating dividers 32 engage the string of sausages 7 more or less simultaneously. During further movement in conveying direction 3, the cooperating dividers 32 come into an exactly opposite position, as shown, for example, in FIG. 8. The forward end of the subsequently forming twist point on the following portion, which continues to form in the course of the process, partly abuts the rear surfaces of the second constriction portions 64 of the two dividers 32, which are preferably arranged substantially approximately in a vertical plane. In contrast, the trailing rear end of portion 5 being formed is in contact or comes into contact with the front surfaces of the first constriction portions 56. During or after further progress in conveying direction 3, the rotation of portion 5 thus being formed is reduced, for example and preferably along a path of 20 mm±5 mm in conveying direction 3, although these values can be varied depending on the length of portion 5. The portions finally reach a state in which they no longer rotate, or only very little, about the longitudinal axis of portion 5 and finally come to a complete standstill. A twist point is thus formed between each of portions 5.

LIST OF REFERENCE SIGNS

1 Assembly
2 Stuffing machine
3 Conveying direction
4 Feeding hopper
5 Sausage portion
6 Twist linking device
7 String of sausages
8 Stuffing tube
10 Portioning device
12 Drive unit
13 Deflection region
14 Motor
16 Toothed belt drive
18 Traversing unit
20 Casing brake
22 Drive shaft
24 Toothed belt drive
26, 28 Conveyor belt
29 Conveying area
30 Guide member
32 Divider
34 Drive means
36, 38 Drive shaft
40, 42 Gear wheel
44, 46 Gear wheel
48, 50 Gear wheel
52 Attachment portion
53 Longitudinal axis
54 Protrusion
56 First constriction portion
57 Plane
58 Edge
60 Edge
62 Middle region
64 Second constriction portion
66 Edge
68 Edge
α Inclination angle
β Angle

What is claimed is:

1. An apparatus for portioning and conveying elongate casings stuffed with a food mass, comprising:
a first conveyor belt and a second conveyor belt arranged adjacent to each other, the first conveyor belt and the second conveyor belt configured to convey the casings, the first conveyor belt having a first conveying area that in operation is moved in a conveying direction, the second conveyor belt having a second conveying area that in operation is moved in the conveying direction, and a return area, and the first conveying area and the second conveying area are configured to receive each casing and convey each casing in the conveying direction;
a first divider arranged on the first conveyor belt, the first divider projecting laterally from the first conveyor belt; and
a second divider arranged on the second conveyor belt, the second divider projecting laterally from the second conveyor belt,
wherein the first divider and the second divider cooperate in the first conveying area and the second conveying area such that each casing is constricted, and the first divider and the second divider each have a first constriction portion for engaging with each casing, and the first constriction portion extends in operation substantially at a slant relative to a plane defined as perpendicular to the conveying direction.

2. The apparatus of claim 1, wherein, in operation, the first constriction portion is substantially slanted at an angle of about 30° +/−15° relative to the plane.

3. The apparatus of claim 2, wherein the first divider and the second divider each have a second constriction portion that extends, in operation, substantially along a vertical plane.

4. The apparatus of claim 3, wherein the first constriction portion and the second constriction portion are plate-shaped and substantially enclose an angle of 150° ±15°.

5. The apparatus of claim 3, wherein the first constriction portion and the second constriction portion each taper from a lower edge portion or an upper edge portion towards a middle region connecting the first constriction portion and the second constriction portion.

6. The apparatus of claim 3, wherein the first constriction portion has a larger or substantially equally large surface relative to the second constriction portion.

7. The apparatus of claim 3, wherein the first divider and the second divider are movable substantially on a circular path towards each other by a deflection region of the first conveyor belt and the second conveyor belt, the first divider and the second divider form a twist point by engaging with each casing that rotates at least partially about its longitudinal axis, and the first conveying area and the second conveying area each have a substantially straight section that adjoins the deflection region.

8. The apparatus of claim 3, wherein the first constriction portion of the first divider and the first constriction portion of the second divider run ahead when viewed in the conveying direction, and the second constriction portion of the first divider and the second constriction portion of the second divider run behind when viewed in the conveying direction.

9. The apparatus of claim 3, wherein the first constriction portion of the first divider in the first conveying area and the first constriction portion of the second divider in the second conveying area are arranged substantially at an acute angle to each other, and the angle is 120° ±30°.

10. The apparatus of claim 3, wherein the second constriction portion of the first divider and the second constriction portion of the second divider are respectively arranged in the first conveying area and the second conveying area at least partly substantially within a substantially perpendicular plane or in parallel substantially perpendicular planes.

11. The apparatus of claim 3 wherein the first divider and the second divider each have a fixing portion, the first constriction portion, the second constriction portion, and the fixing portion are substantially plate-shaped, the fixing portion of the first divider is substantially rectangular in shape and extends substantially parallel to the first conveyor belt, and the fixing portion of the second divider is substantially rectangular in shape and extends substantially parallel to the second conveyor belt.

12. The apparatus of claim 3, wherein the first divider and the second divider are dimensioned that, in the first conveying area and second conveyor area during operation, to have a small spacing between each other in a central indentation region so as to form a cavity between the first divider and the second divider.

13. The apparatus of claim 1, wherein the first divider and the second divider are substantially integral components comprising a metal or a plastic, the first divider has a first fixing portion configured to fix the first divider to the first conveyor belt, and the second divider has a second fixing portion configured to fix the second divider to the second conveyor belt.

14. The apparatus of claim 1, wherein the first constriction portion of the first divider and the first constriction portion of the second divider initially engage each casing in an infeed area and form a twist point upon further reduction of a spacing between the first divider and the second divider relative to each other.

15. The apparatus of claim 1, wherein the first divider and the second divider are substantially identical in design, and the first divider and the second divider are inversely positioned with a 180° offset from each other.

16. The apparatus of claim 1, further comprising:
a first plurality of guide members arranged on the first conveyor belt adjacent to the first divider; and
a second plurality of guide members arranged on the second conveyor belt adjacent to the second divider,
wherein the first plurality of guide members and the second plurality of guide members are configured to support each casing during operation.

17. The apparatus of claim 1, further comprising:
a stuffing machine having a feeding hopper configured to receive the food mass and a feed pump; and
a twist linking unit having a stuffing tube configured to stuff the food mass into each casing.

18. A method for producing portions in a casing stuffed with a food mass, comprising:
stuffing the casing with the food mass and a twist linking unit into the casing to be stuffed; and
rotating the casing about a longitudinal axis as the casing is conveyed into an infeed and a conveying area of a portioning device, wherein the portioning device has a first conveyor belt and a second conveyor belt that are spaced apart, the first conveyor belt has a first divider fixed thereto, and the second conveyor belt has a second divider fixed thereto, wherein the first divider and the second divider each have a constriction portion which in operation extends substantially at a slant relative to a vertical plane, the casing is gripped in an infeed area by the first divider and the second divider, and the first divider and the second divider are configured to move towards one another, in order to form a twist point.

* * * * *